US012730121B2

(12) United States Patent
Abboud et al.

(10) Patent No.: US 12,730,121 B2
(45) Date of Patent: Sep. 8, 2026

(54) METHOD, DEVICE AND COMPUTER PROGRAM FOR ESTIMATING A SPEED OF A WHEELED VEHICLE

(71) Applicants: SAFRAN, Paris (FR); INSTITUT NATIONAL DE RECHERCHE EN INFORMATIQUE ET EN AUTOMATIQUE, Rocquencourt (FR)

(72) Inventors: Dany Abboud, Moissy-Cramayel (FR); Axel Barrau, Moissy-Cramayel (FR); Maxime Leiber, Moissy-Cramayel (FR); Yosra Marnissi, Moissy-Cramayel (FR)

(73) Assignees: SAFRAN, Paris (FR); INSTITUT NATIONAL DE RECHERCHE EN INFORMATIQUE ET EN AUTOMATIQUE, Rocquencourt (FR)

( * ) Notice: Subject to any disclaimer, the term of this patent is extended or adjusted under 35 U.S.C. 154(b) by 347 days.

(21) Appl. No.: 18/281,137

(22) PCT Filed: Mar. 9, 2022

(86) PCT No.: PCT/FR2022/050421
§ 371 (c)(1),
(2) Date: Sep. 8, 2023

(87) PCT Pub. No.: WO2022/189754
PCT Pub. Date: Sep. 15, 2022

(65) Prior Publication Data

US 2024/0175890 A1 May 30, 2024

(30) Foreign Application Priority Data

Mar. 11, 2021 (FR) ...................................... 2102407

(51) Int. Cl.
*G01P 3/48* (2006.01)
*G01H 1/10* (2006.01)
(Continued)

(52) U.S. Cl.
CPC ................ *G01P 3/48* (2013.01); *G01H 1/10* (2013.01); *G01N 29/46* (2013.01); *G01P 3/50* (2013.01)

(58) Field of Classification Search
CPC ........................................................ G01P 3/48
See application file for complete search history.

(56) References Cited

U.S. PATENT DOCUMENTS

2008/0262678 A1* 10/2008 Nishimura ........... B62D 5/0472 701/42
2012/0330493 A1 12/2012 Hanatsuka et al.
(Continued)

FOREIGN PATENT DOCUMENTS

CN 110612559 A 12/2019
WO WO 2018/165178 A1 9/2018

OTHER PUBLICATIONS

International Search Report (PCT/ISA/210), issued in PCT/FR2022/050421, dated Jul. 4, 2022.
(Continued)

*Primary Examiner* — Hyun D Park
(74) *Attorney, Agent, or Firm* — Birch, Stewart, Kolasch & Birch, LLP

(57) ABSTRACT

The present invention relates to a method for estimating a speed (v) of movement of a wheeled vehicle, wherein a frequency trajectory ($\xi_t$) representative of the speed (v) of a wheel (RO) of the vehicle (VE) in a filtered spectrogram ($S(f_t, t)$) is estimated (E5) as follows: a probability ($p_{Zt|\xi_t}$) of observation of the trajectory (ft) is estimated (E51) on the basis of a computed amplitude of the filtered spectrogram
(Continued)

$(S(f_t, t))$, an a posteriori observation law $(p_{Zt|\xi_t})$ proportional to the product of the probability $(p_\xi)$ and of the probability $(p_{\xi|Z})$' is estimated (E52), the trajectory (ft) is estimated (E53) on the basis of the law $(p_{\xi|Z})$, and the speed (v) of movement of the wheel of the vehicle is estimated (E6) on the basis of the trajectory $(\xi_t)$.

13 Claims, 6 Drawing Sheets

(51) Int. Cl.
*G01N 29/46* (2006.01)
*G01P 3/50* (2006.01)

(56) References Cited

U.S. PATENT DOCUMENTS

2014/0278206 A1 9/2014 Girod et al.
2017/0066464 A1 3/2017 Carter et al.
2018/0154707 A1* 6/2018 Singh ..................... B60C 23/04
2018/0257688 A1 9/2018 Carter et al.
2019/0236859 A1 8/2019 Bradley

OTHER PUBLICATIONS

Karlsson et al., "The Future of Automotive Localization Algorithms: Available, reliable, and scalable localization: Anywhere and anytime", IEEE Signal Processing Magazine, Mar. 3, 2017, pp. 60-69.

Yuqian et al., "Instantaneous Frequency Estimation of Run-Up or Run-Down Sign of Rotating Machinery," Chinese Journal of Mechanical Engineering, vol. 39, No. 9, Sep. 2003, pp. 75-80, with English abstract.

* cited by examiner

SP
ECH
80
60
40
20
0
-20
-40
-60
-20
t
350
300
250
200
150
100
50
0
COMPF
$\xi_t$
$SP_t$
$f_t$
$\Omega$
35
30
25
20
15
10
5
0

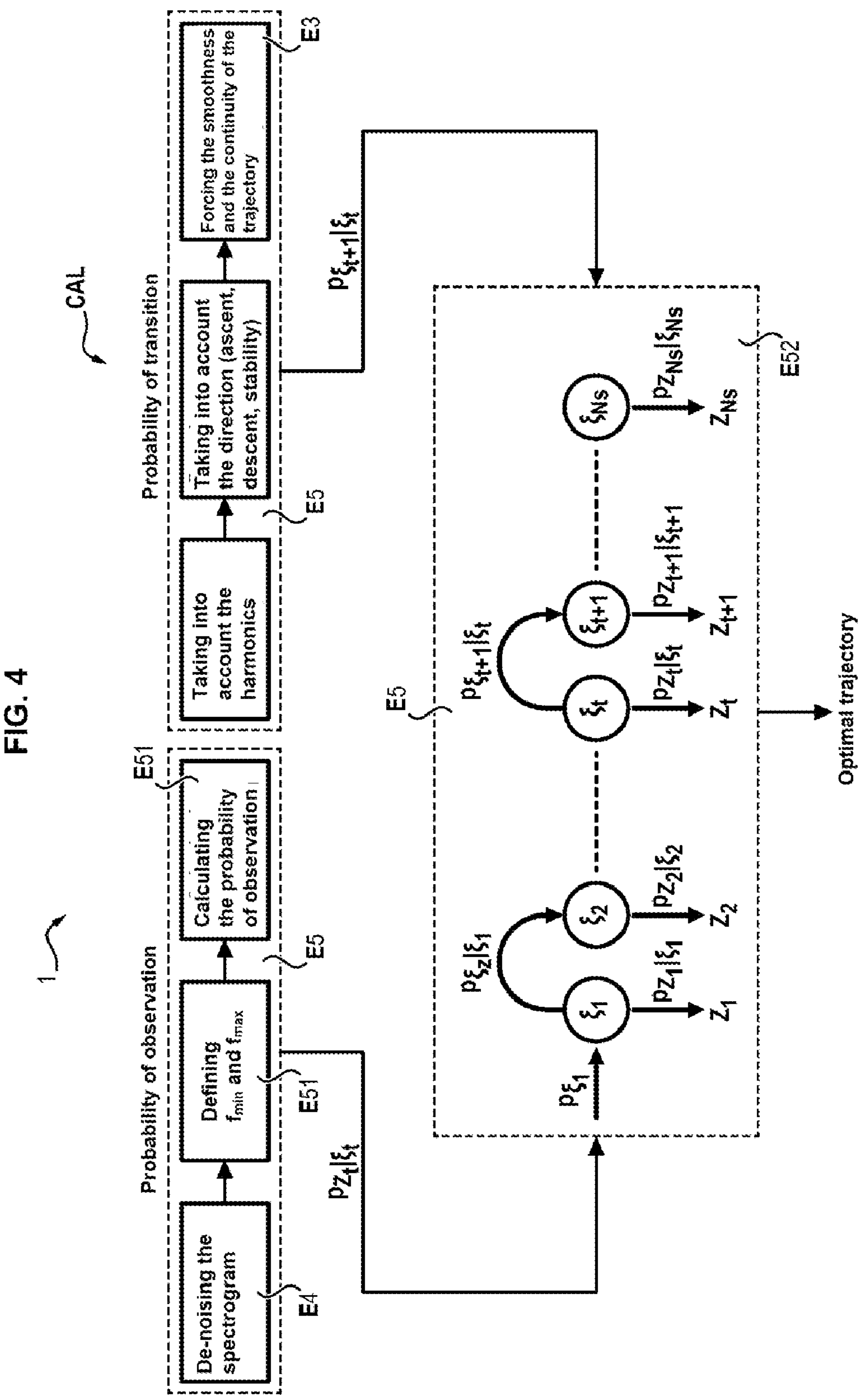
FIG. 4
1
CAL
Probability of observation
De-noising the spectrogram
E4
Defining $f_{min}$ and $f_{max}$
E51
Calculating the probability of observation
E51
E5
Probability of transition
Taking into account the harmonics
Taking into account the direction (ascent, descent, stability)
E5
Forcing the smoothness and the continuity of the trajectory
E3
$p_{z_t|\xi_t}$
$p_{\xi_{t+1}|\xi_t}$
E5
$p_{\xi_1}$
$\xi_1$
$\xi_2$
$\xi_t$
$\xi_{t+1}$
$\xi_{Ns}$
$p_{\xi_2|\xi_1}$
$p_{\xi_{t+1}|\xi_t}$
$p_{z_1|\xi_1}$
$p_{z_2|\xi_2}$
$p_{z_t|\xi_t}$
$p_{z_{t+1}|\xi_{t+1}}$
$p_{z_{Ns}|\xi_{Ns}}$
$z_1$
$z_2$
$z_t$
$z_{t+1}$
$z_{Ns}$
E52
Optimal trajectory Raw signal
X Spectrogram
SP
Harmonic
Frequency of the wheels
SP$_t$ De-noised spectrogram
S($f_t$, f)

Probability of observation
$p_{Z_t|\xi_t}$

Taking into account the harmonics
$p_\xi$

Estimated trajectory
$\xi_t$

METHOD, DEVICE AND COMPUTER PROGRAM FOR ESTIMATING A SPEED OF A WHEELED VEHICLE

The invention relates to a method, a device and a computer program for estimating a travel speed of a vehicle with a wheel for rolling on the ground.

The field of application of the invention is in particular rolling land motor vehicles, aircrafts with a landing gear having wheels rolling on the ground on takeoff or landing.

The instantaneous speed of a vehicle is a very significant data in the field of inertial navigation. In the state of the art, the speed signal is generally measured by an additional speed sensor (odometer) placed on the wheel of the vehicle. The installation of such a sensor has a cost and cannot always be envisaged in some applications, particularly in aeronautics and in military land navigation.

The invention seeks to dispense with a direct speed sensor such as an odometer or a position sensor.

One goal of the invention is to develop a method, a device and a computer program for estimating a travel speed of a vehicle having a wheel for rolling on the ground, which are capable of estimating with accuracy the instantaneous speed of a wheeled vehicle from at least one inertial or vibratory sensor (which may for example be an accelerometer or gyroscope or microphone), by dispensing with a direct speed sensor such as an odometer or a position sensor.

In the state of the art, attempts have been made to overcome the problem of absence of a direct speed sensor by exploiting the information present in the inertial signals, as for example in the document “The Future of Automotive Localization Algorithms: Available, reliable, and scalable localization: Anywhere and anytime” by Rickard Karlsson and Fredrik Gustafsson, 2017. According to this document, the estimate of the instantaneous speed from an inertial signal is calculated by selecting at each instant the more energetic frequency of a spectrogram. This type of approach can be effectively applicable in some simple applications where the noise is low, but not in the application field mentioned above, where the noise-to-signal ratio is often very high. The method described by this document by Rickard Karlsson and Fredrik Gustafsson is not robust to environmental noise such as the combustion of an engine and requires a spectrum in which the peaks are easily identifiable, which is not possible in the presence of a combustion engine. In addition, the spectrum of the inertial or vibratory signal is rich in harmonics, and these undergo considerable energy leaks, which makes the identification of the peaks by Fourier transforms difficult. The great majority of the inertial navigation systems of the state of the art cannot be used in dominant environmental noise.

In some applications, in particular aeronautical applications and military land vehicles, where the number of sensors is very limited, the installation of a position sensor is very difficult, even impossible in aeronautics. The presence of an instantaneous speed signal is of great importance for a navigation system in order to estimate the position of a carrier in a very accurate manner. For this, there is a need to measure this instantaneous speed without the need to add hardware instrumentation on the wheels of the vehicle.

The invention aims to obtain a method, a device and a computer program for estimating a travel speed of a vehicle having a wheel rolling on the ground, which overcome the drawbacks mentioned above and achieves the goals mentioned above.

To this end, a first object of the invention is a method for estimating a travel speed of a vehicle having at least one wheel for rolling on the ground, characterized by:

- measuring an inertial or vibratory signal by at least one inertial or vibratory sensor of the vehicle,
- calculating by at least one calculator a plurality of spectra of the signal over a plurality of successive time windows defined with respect to successive instants, the plurality of spectra forming at least one spectrogram as a function of the successive instants,
- filtering the spectrogram by at least one noise attenuation and/or deterministic feature extraction filter, to obtain at least one filtered spectrogram of the signal on the successive instants,
- estimating by the calculator a frequency trajectory representative of the speed of the wheel of the vehicle in the filtered spectrogram on the successive instants, by:
- estimating by the calculator a probability of observation of the frequency trajectory from a calculated amplitude of the filtered spectrogram for each instant,
- estimating by the calculator an a posteriori law of observation of the frequency trajectory as being proportional to the product of a prescribed probability of transition of the frequency trajectory and of the probability of observation of the frequency trajectory,
- estimating by the calculator the frequency trajectory for the successive instants from the a posteriori law of observation of the frequency trajectory,
- estimating by the calculator the travel speed of the wheel of the vehicle for the successive instants from the frequency trajectory, that has been estimated.

The invention thus proposes a method for estimating the inertial or vibratory signal, which is robust to noise and which uses the frequency information present in the (inertial or vibratory) measured signal, and a methodology based on a specifically dedicated probabilistic approach. The invention, unlike the state of the art, makes it possible to overcome the environmental noise and to extract a speed signal of the vehicle without using an odometer and thus allows the exploitation of the data in real cases. It is expressed as a function of the amplitude at each point of the time-frequency plane and a transition law making it possible to promote the continuity, the direction and the smoothness of the trajectory while exploiting the kinematics of the system such as the harmonics. An inertial signal is always present in the event that a vehicle navigation system is present. In the case of the vibration sensor, the frequency of the vibrations emitted by the wheels of the vehicle is proportional to the speed of the vehicle (simply multiply by the perimeter of the wheel).

According to one embodiment of the invention, it is provided determining by the calculator a support of frequency values, estimating by the calculator the frequency trajectory as being for each instant in the support the frequency value that maximizes the a posteriori law of observation of the frequency trajectory until this instant.

According to one embodiment of the invention, it is provided determining by the calculator a support of frequency values, estimating by the calculator the frequency for each instant as being a barycenter of the a posteriori law of observation of the frequency, taken at the frequency values of the support and subjected to these frequency values.

According to one embodiment of the invention, it is provided determining by the calculator a support $\Omega$ of frequency values, estimating by the calculator the probability of observation knowing a trajectory as dependent on the calculated amplitude of the filtered and normalized spectrogram for each instant.

According to one embodiment of the invention, it is provided estimating by the calculator the probability $p_{Z_t|\xi_t}$ of observation is according to the following equation:

$$p_{Z_t|\xi_t=f_t}(z_t)=|S(f_t,t)|\cdot 1_{[f_{min}(t),f_{max}(t)]}(f_t)$$

where $|S(f_t, t)|$ is the calculated amplitude of the spectrogram $|S(f_t, t)$ filtered for each instant t, $f_{min}(t)$ is a minimum frequency trajectory that has been measured, $f_{max}(t)$ is a maximum frequency trajectory that has been measured, $f_{min}(t)$ and $f_{max}(t)$ are such that $f_{min}(t)\le\xi_t\le f_{max}(t)$, $1_{[f_{min}(t),f_{max}(t)]}(f_t)$ is a function taking the value 1 for $f_t$ between $f_{min}(t)$ and $f_{max}(t)$ and taking the value 0 for $f_t$ below $f_{min}(t)$ or above $f_{max}(t)$.

According to one embodiment of the invention, it is provided estimating by the calculator the probability $p_{Z_t|\xi_t}$ of observation according to the following equation:

$$p_{Z_t|\xi_t=f_t}(z_t)=\prod_{j\,|\,j\cdot f_t<\frac{F_s}{2}}\frac{1}{c_t}|S(j\cdot f_t,t)|1_{[f_{\min}(t),f_{\max}(t)]}(f_t)$$

where j is a positive integer or real number, satisfying $$j\cdot f_t<\frac{F_s}{2}$$

where $f_t$ denotes the frequencies of each filtered spectrogram $S(f_t, t)$ at the instant t, and where $F_S$ is a threshold frequency that has been predetermined as a function of the filtered spectrogram $S(f_t, t)$.

According to one embodiment of the invention, a support of frequency values is determined by the calculator, the probability $p_{Z_t||\xi_t}$ of observation of the frequency trajectory $\xi_t$ is estimated by the calculator according to the following equations:

$$p_{Z_t|\xi_t=f_t}(z_t)=\prod_{f\in\Omega}p_{Z_t[f]|\xi_t=f_t}(z_t[f])$$

for $\xi_t=f_t\in\Omega$ with $p_{Z_t|[f_t]|\xi_t=f_t}(z_t[f_t]=1)$ dependent on the calculated amplitude of the filtered spectrogram for each instant t, $$p_{Z_t[f]|\xi_t=f_t}(z_t[f]=1)=0 \text{ for } f\ne f_t$$

where $Z_t$ is a binary vector of observation having a size $N_S$ prescribed for the instant $t\in\{1, \ldots, N_S\}$ such that $Z_t[f]=1$ if $\bar{f}_t=f$ otherwise $Z_t[f]=0$ for $f\ne\bar{f}_t$ According to one embodiment of the invention, $$p_{Z_t[f_t]|\xi_t=f_t}(z_t[f_t]=1)=\frac{1}{c_t}|S(f_t,t)|\cdot 1_{[f_{\min}(t),f_{\max}(t)]}(f_t)$$

where $|S(f_t, t)|$ is the calculated amplitude of the spectrogram $S(f_t, t)$ filtered for each instant t, $$c_t=\max_{f\in[f_{min}(t),f_{max}(t)]}z_t[f]$$

$f_{min}(t)$ is a minimum frequency trajectory that has been measured, $f_{max}(t)$ is a maximum frequency trajectory that has been measured, $f_{min}(t)$ and $f_{max}(t)$ are such that $f_{min}(t)\le\xi_t\le f_{max}(t)$, $1_{[f_{min}(t),f_{max}(t)]}(f_t)$ is a function taking the value 1 for $f_t$ between $f_{min}(t)$ and $f_{max}(t)$ and taking the value 0 for $f_t$ below $f_{min}(t)$ or above $f_{max}(t)$.

According to one embodiment of the invention, it is provided determining by the calculator a support $\Omega$ of frequency values, prescribing by the calculator the probability $p_\xi(f_1, \ldots, f_{N_S})$ of transition of the frequency trajectory $\xi_t$ for the instant $N_S$ starting from a given initial probability $p_{\xi_1}$ of the instant 1, for $t\in\{1, \ldots, N_S\}$ and for each frequency $f_t\in\Omega$ according to the following equation:

$$p_\xi(f_1,\ldots,f_{N_s})=p_{\xi_1}(f_1)\prod_{t=1}^{N_S-1}p_{\xi_{t+1}|\xi_t=f_t}(f_{t+1})$$

where $N_S$ is a prescribed integer, greater than or equal to two, of successive prescribed instants t, where $p_{\xi_{t+1}|\xi_t=f_t}(f_{t+1})$ is the probability of transition from the frequency $\xi_t$ of the trajectory of the present instant t to the frequency $\xi_{t+1}$ of the frequency trajectory of the next instant t+1.

According to one embodiment of the invention, the probability $p_{\xi_{t+1}|\xi_t=f_t}(f_{t+1})$ of transition from the frequency $\xi_t$ of the frequency trajectory of the present instant t to the frequency $\xi_{t+1}$ of the frequency trajectory of the next instant t+1 follows a conditional Gaussian law centered on the frequency $f_t$ of the filtered spectrogram at the instant t.

According to one embodiment of the invention, the conditional Gaussian law centered on the frequency $f_t$ has a standard deviation $\sigma_t=\Delta t\cdot\gamma_t$ where $\Delta t$ is a calculated time resolution of the spectrogram of the instant t, $\gamma_t$ is a calculated average speed with which the frequency trajectory $\xi_t$ evolves between the instant t and the next instant t+1.

According to one embodiment of the invention, it is provided estimating by the calculator the travel speed of the wheel of the vehicle by multiplying the frequency trajectory by $2\pi R$, where R is the radius of the wheel and is predetermined or estimated.

According to one embodiment of the invention, the noise attenuation and/or deterministic feature extraction filter comprises a sliding median filter and/or a deterministic feature separation filter with respect to random features.

A second subject-matter of the invention is a device for estimating a travel speed of a vehicle having at least one wheel for rolling on the ground, characterized in that the device comprises:

an inertial or vibratory sensor of the vehicle for measuring an inertial or vibratory signal, a calculator configured to calculate a plurality of spectra of the signal over a plurality of successive time windows defined with respect to successive instants, the plurality of spectra forming at least one spectrogram as a function of the successive instants, a filter for attenuating noise and/or extracting deterministic features in the spectrogram, to obtain at least one filtered spectrogram of the signal over the successive instants, the calculator being configured to estimate a frequency trajectory, representative of the speed of the wheel of the vehicle in the filtered spectrogram over the successive instants, by:

estimation, by the calculator, of a probability of observation of the frequency trajectory from a calculated amplitude of the filtered spectrogram for each instant, estimation, by the calculator, of an a posteriori law of observation of the frequency trajectory as being proportional to the product of a prescribed probability of transition of the frequency trajectory and of the probability of observation of the frequency trajectory, estimation, by the calculator, of the frequency trajectory for the successive instants from the a posteriori law of observation of the frequency trajectory, the calculator being configured to estimate the travel speed of the wheel of the vehicle for the successive instants from the frequency trajectory.

A third subject-matter of the invention is a computer program, comprising code instructions for the implementation of the method for estimating the travel speed of the vehicle as described above, when it is executed in a calculator.

The invention will be better understood upon reading the following description, given only by way of non-limiting example with reference to the figures below of the appended drawings.

FIG. 1 represents an example of a flowchart of the progress of the method for estimating a travel speed of a vehicle having a wheel for rolling on the ground according to embodiments of the invention.

FIG. 2 schematically represents an example of a step of calculating spectrograms of a signal of the method, of the device and of the program for estimating a travel speed of a vehicle having a wheel for rolling on the ground according to embodiments of the invention.

FIG. 3 represents an example of a spectrogram of a time signal in the time-frequency plane of the method, of the device and of the program for estimating a travel speed of a vehicle having a wheel for rolling on the ground according to embodiments of the invention.

FIG. 4 schematically represents an example of a device for estimating a travel speed of a vehicle having a wheel for rolling on the ground according to embodiments of the invention.

Figure 11:
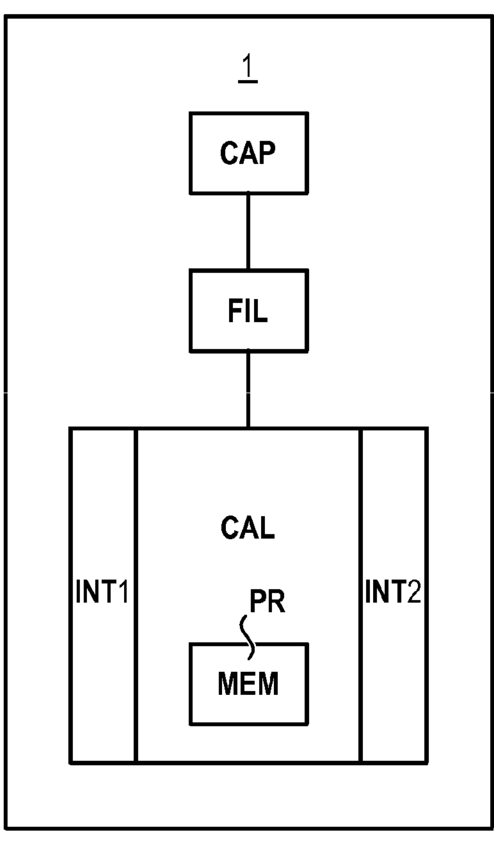

FIG. 11 schematically represents an example of a device for estimating a travel speed of a vehicle having a wheel for rolling on the ground according to embodiments of the invention.

Referring to FIGS. 1 to 10, there will be described in more details below embodiments and exemplary embodiments of the method, of the device 1 and of the computer program for estimating an instantaneous travel speed v of a vehicle VE having a wheel RO for rolling on the ground.

In the field of application of the invention, mentioned above, in the case where vibratory signals derived from complex mechanical systems such as land vehicles or aeronautical systems are used, these signals are strongly affected by noise (the ambient, combustion and aerodynamic noises, etc.), especially for interfering and asynchronous rotating sources. Thus, the identification of the correct trajectory representing the travel speed v of the vehicle VE in the time-frequency plane is particularly difficult under conditions of low signal-to-noise ratio: a few peaks related to the instantaneous frequency can be discriminated and false peaks due to noise can take their place locally. This first difficulty can be resolved by adding a step E4 of pre-processing the time-frequency representation by noise filtering to improve the emergence of the wheel signature with respect to the background noise. The proposed de-noising method E4 enables not only to attenuate the background noise but also to attenuate the quasi-stationary components in the time-frequency plane in the case where the component sought is strongly non-stationary (ascent regime, descent regime) and conversely attenuates the non-stationary components in the case where the component sought is quasi-stationary.

Then, the multi-component nature of the signal and the possibility of existence of asynchronous components in the engine as in an aircraft engine, means that in the same frequency band, several harmonics can coexist, cross, be very close or even confused. Thus, by simply following the maxima at each instant, one may deviate from the correct trajectory and therefore provide an erroneous estimate of the speed v. To overcome this problem, the invention provides in the estimation procedure, in addition to the amplitude of the spectrogram, additional constraints on the optimal trajectory resulting in the estimation of a probability of transition. Taking into account several harmonics and the direction of the trajectory of interest makes it possible, for example, to give more weight to trajectories closer to that of the instantaneous frequency sought, which is advantageous for the coupling moments between different components. The addition of these regularity constraints by the estimation of a probability of transition also makes it possible to avoid the jumps and discontinuities in the presence of isolated peaks related to the residual noise after the pre-processing step E4.

The objective is to search, among all the possible trajectories in the spectrograms over time, for an optimal frequency trajectory $\xi_t$ or $\hat{\xi}$, which satisfies the considered constraints and which is representative of the speed v of the wheel RO of the vehicle VE. The optimality of one trajectory compared to another is measured by a cost function or in an equivalent way by a probability density. To do so, the information of the spectrogram and the constraints are expressed in the form of probabilities. More particularly, the frequency trajectory $\xi_t$ or $\xi_1, \ldots, \xi_{N_S}$ can be modeled by a Markov chain with a transition density $p_{\xi_{t+1}|\xi_t}$ and a given initial probability $p_{\xi_1}$. The transition density is defined as a function of the added constraints (continuity, harmonics, direction, etc.). At each time step t, an observation of the spectrogram is provided with a probability $p_{Z_t|\xi_t}$ which depends on the amplitude of the spectrogram. The frequency trajectory $\xi_t$ of the travel speed v of the vehicle VE can be chosen as being the one that maximizes the a posteriori law $$p\xi_1, \ldots, \xi_{N_S} | Z_1, \ldots, Z_{N_S}$$

(or by calculating its average). It is also possible to calculate the uncertainties on this estimate by focusing on the second-order moments. The number of harmonics to be taken into account can be entered by the user on the physical data input interface INT1.

Figures 5, 6, 7, 8, 9, 10:
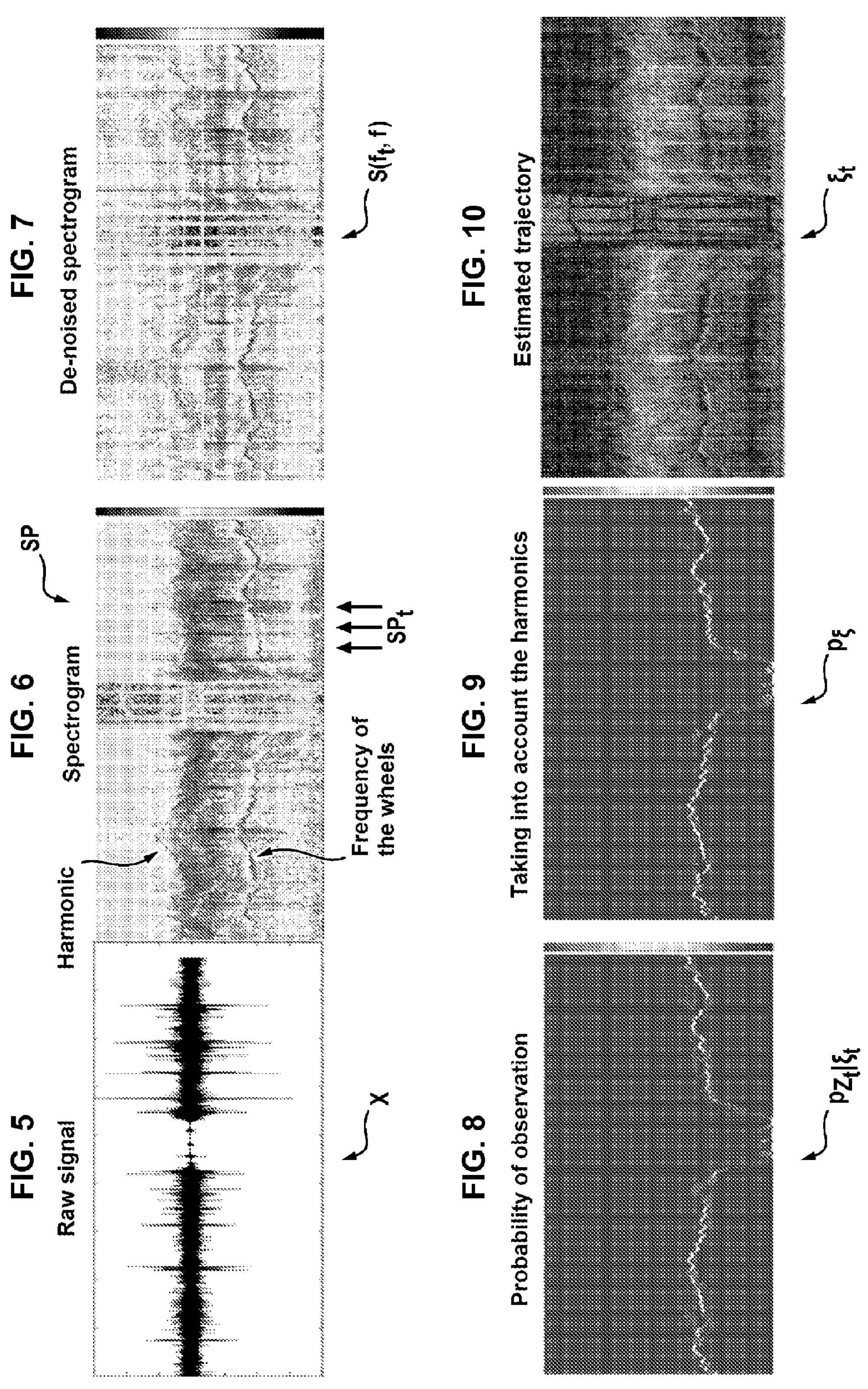
FIG. 5 represents an example of a raw signal that can be measured by the method, the device and the program for estimating a travel speed of a vehicle having a wheel rolling on the ground according to embodiments of the invention.
FIG. 6 represents a spectrogram of the signal of FIG. 5, which can be calculated by the method, the device and the program for estimating a travel speed of a vehicle having a wheel for rolling on the ground according to embodiments of the invention.
FIG. 7 represents an example of a filtered spectrogram of the signal of FIG. 5, which can be calculated by the method, the device and the program for estimating a travel speed of a vehicle having a wheel for rolling on the ground according to embodiments of the invention.
FIG. 8 represents an example of probability of observation of the frequency trajectory, which can be calculated from the signal of FIG. 5 by the method, the device and the program for estimating a travel speed of a vehicle having a wheel for rolling on the ground according to embodiments of the invention.
FIG. 9 represents an example of probability of transition of the frequency trajectory, which can be calculated from the signal of FIG. 5 by the method, the device and the program for estimating a travel speed of a vehicle having a wheel for rolling on the ground according to embodiments of the invention.
FIG. 10 represents an example of a frequency trajectory, which can be calculated from the signal of FIG. 5 by the method, the device and the program for estimating a travel speed of a vehicle having a wheel for rolling on the ground according to embodiments of the invention.

In the figures, the method for estimating a travel speed v of a vehicle having one (or more) wheel(s) RO for rolling on the ground comprises a first step E1 of measuring a time signal X, which is inertial or vibratory from one (or more) inertial or vibratory sensor(s) CAP of the vehicle. This inertial or vibratory sensor CAP may be located outside the engine of the vehicle. The inertial or vibratory sensor CAP may be present on the wheel RO for rolling on the ground of the vehicle VE. Due to an extreme environment, a sensor is often subject to faults or measurement errors. The sensor (s) CAP can be or comprise one (or more) accelerometer(s) and/or one (or more) gyroscope(s) and/or one (or more) acoustic sensor(s) and/or one (or more) microphone(s). The invention can use inertial sensors that are not located in the engine. Moreover, in the case where the vehicle VE comprises an inertial unit composed of 6 inertial sensors (3 accelerometers and 3 gyroscopes), the invention can use the redundancy of sensors CAP formed by several or all of these 6 inertial sensors to improve the accuracy of the speed information v (the risk of simultaneous measurement error on 6 sensors being lower). An example of a raw signal X as a function of time on the abscissa is illustrated in FIG. 5.

Figure 1:
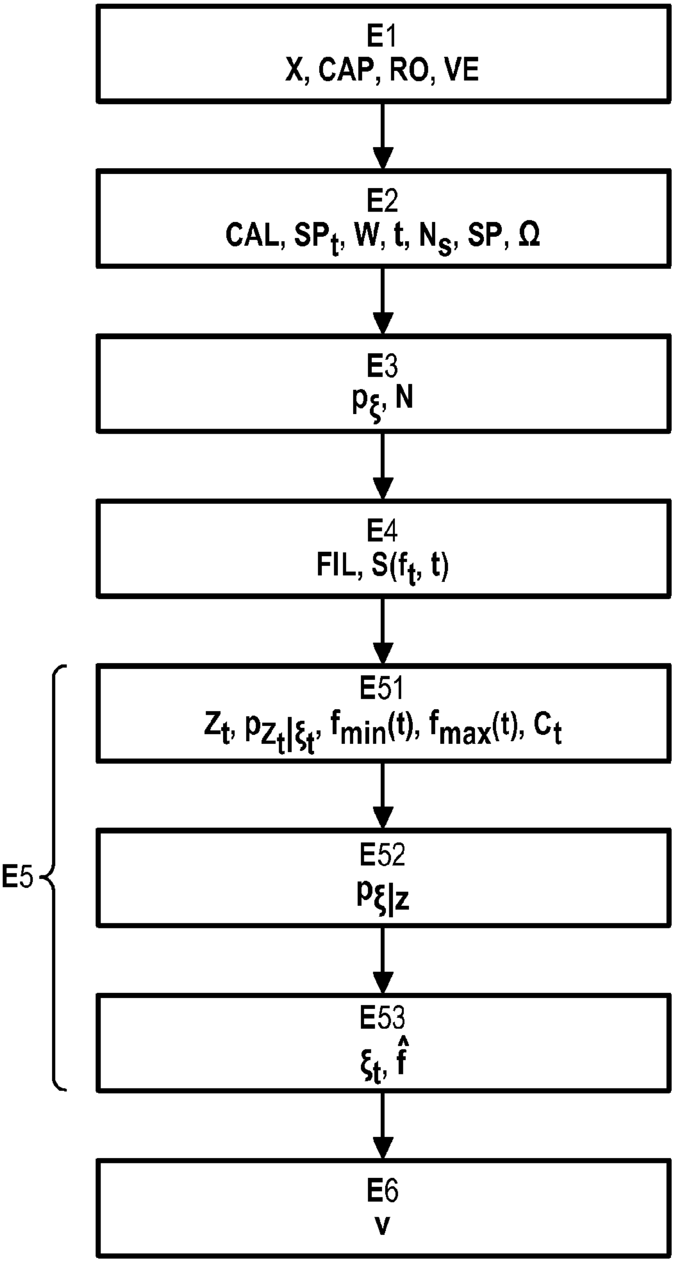
Figure 2:
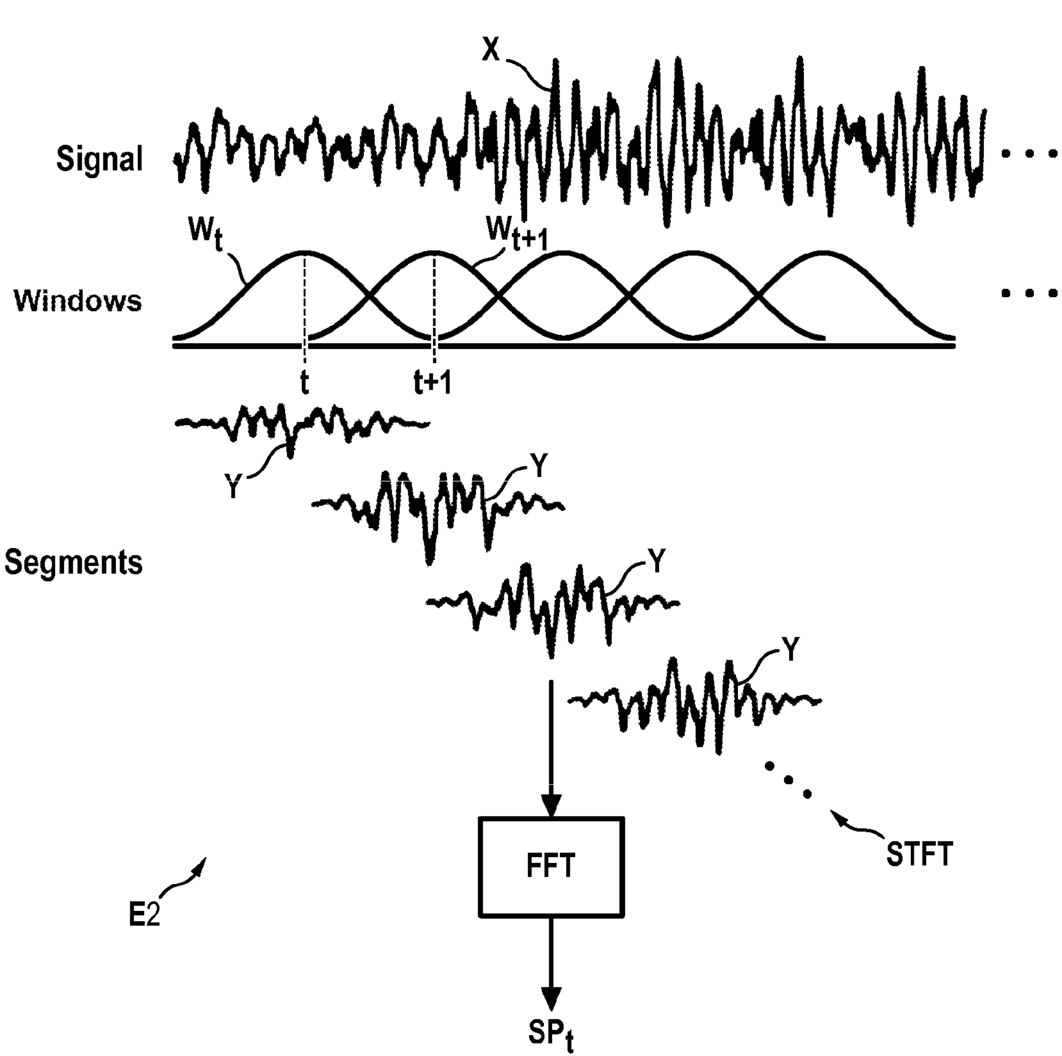

During a second step E2 subsequent to the first step E1, several spectra $SP_t$ of the time signal X are calculated by one (or more) calculator(s) CAL over respectively several successive (or sliding) time windows $W_t$, which are defined with respect to successive instants t, as represented for example in FIG. 2. Each time window $W_t$ can be for example centered on the instant t and has a predetermined finite time width with respect to the instant t (for example the successive time windows $W_t$ can have identical time widths). The calculator CAL calculates several successive partial time signals Y (or time segments Y), respectively equal to the signal X multiplied by the successive time windows $W_t$ for the successive instants t. For example, the successive instants t belong to the set $\{1, \ldots, N_S\}$, where $N_S$ is a predefined number, greater than 1. The instants t can be multiples of the same sampling step to the nearest prescribed constant and be expressed in the following by an integer of sampling steps to the nearest prescribed constant. The sampling step and/or the sampling frequency can be entered by the user on the physical data input interface INT1 or can be pre-recorded in the calculator CAL. The sampling step and/or the sampling frequency defines the number of samples acquired per second and the instants t.

The calculator(s) CAL can be or comprise one or more computer(s), one or more server(s), one or more machine(s), one or more processor(s), one or more microprocessor(s). The calculator CAL can comprise one or more physical data input interface(s) INT1, one or more physical data output interface(s) INT2. This or these physical data input interface(s) INT1 can be or comprise one or more computer keyboard(s), one or more physical data communication port(s), one or more touch screen(s), or the like. This or these physical data output interfaces INT2 can be or comprise one or more physical data communication port(s), one or more screen(s), or the like. The device 1 for estimating the travel speed v of the vehicle having one or more wheel(s) RO for rolling on the ground comprises in particular the sensor(s) CAP, the calculator(s) CAL and the filter(s) FIL, as illustrated by way of example in FIG. 11. The filter FIL can be comprised in the calculator CAL or be separate from the calculator CAL. The sensor CAP is configured to execute the step E1 mentioned above. The filter FIL is configured to execute the step E4 mentioned below. The calculator CAL is configured to execute the steps E2, E3, E5, E6 (and possibly E4) and the sub-steps E51, E52, E53 mentioned below. The calculator CAL and/or the filter FIL and/or the sensor CAP can be programmed by a computer program PR comprising code instructions implementing the method for estimating the travel speed v of the vehicle, namely to perform the step E1 and/or E2 and/or E3 and/or E4 and/or E5 and/or E6 and the sub-step E51 and/or E52 and/or E53. The calculator CAL comprises a non-volatile memory MEM (or a non-volatile recording medium MEM), in which the computer program PR is recorded permanently. The non-volatile memory MEM or the non-volatile recording medium MEM is readable by a computer and comprises instructions recorded thereon, which when executed by a processor, cause the processor to execute the step E1 and/or E2 and/or E3 and/or E4 and/or E5 and/or E6 and the sub-step E51 and/or E52 and/or E53. The signal X and the data mentioned above and below, used by the method, the device 1 and the program PR are recorded in the memory MEM.

The device 1 for estimating the travel speed v of the vehicle VE having a wheel RO can be embedded on the vehicle VE. The device 1 for estimating the travel speed v can be an inertial navigation aid tool and can be integrated into an inertial navigation device, which is comprised in an inertial unit present on the vehicle. The inertial unit can comprise 3 accelerometers in 3 non-parallel directions, 3 gyroscopes around 3 non-parallel directions, the inertial navigation device and navigation functions.

According to one embodiment of the invention, the calculator CAL calculates during the second step E2 for each partial time signal Y the spectrum $SP_t$ equal to a Fourier transform (which can be for example a fast Fourier transform FFT), limited to the respective time window $W_t$, of this partial time signal Y (short-time Fourier transform, also called STFT). The calculator CAL thus calculates the Fourier transform on the sliding windows $W_t$ of the time signal X, and therefore the plurality of spectra $SP_t$ for respectively the plurality of successive instants t. Each spectrum $SP_t$ gives an amplitude of the spectrum as a function of the frequency f.

For each sensor CAP providing a measurement signal X, the series of spectra $SP_t$ thus obtained form, for the successive instants t, a spectrogram SP. The spectrogram SP is calculated by the calculator CAL. Each spectrum $SP_t$ forms a column of the spectrogram SP, as illustrated by way of example in FIG. 3. Thus, if a multiplicity of sensors CAP provide a multiplicity of signals X, the calculator CAL correspondingly calculates a multiplicity of spectrograms SP and a multiplicity of spectrograms $S(f_r, t)$. In the case of several spectrograms SP and $S(f_t, t)$, these spectrograms SP and $S(f_t, t)$ can undergo different processing operations for the same sensor.

Figure 3:
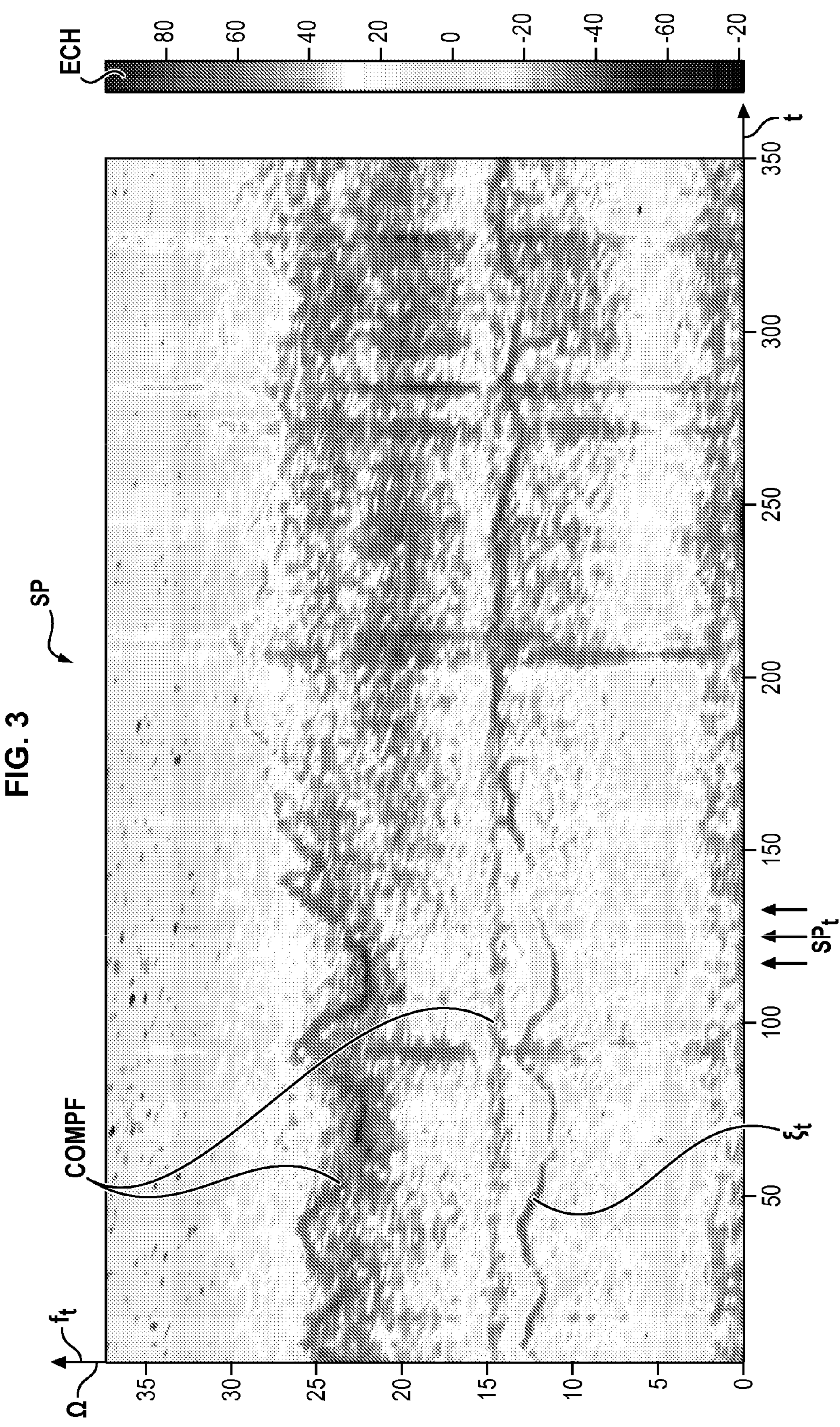

A representation in time-frequency plane, such as for example that of FIGS. 3 and 6 from the signal of FIG. 5, represents in the form of an image:

- on the abscissa (time) axis: the successive instants t,
- on the ordinate axis: the frequencies $f_t$ of the respective spectra $SP_t$ for each instant t,
- in gray levels and in logarithmic scale on the vertical time t axes: the absolute value of the amplitude of the respective spectrum $SP_t$ for each instant t, the absolute value of this amplitude being related to the gray-level scale ECH.

FIG. 3 represents as an example the spectra $SP_t$ in the time-frequency plane of an inertial signal X obtained by an inertial sensor CAP formed by a lateral accelerometer recorded on a car VE. The examples of recordings in FIGS. 5 to 10 were obtained on a car VE from an inertial sensor CAP. The response of the mechanical system strongly depends on the regime in which it operates, hence the advantage of conditioning the analysis results of the signal X at the speed v at each instant. A time-frequency representation makes it possible to reveal the signatures related to the mechanical sources. Such a representation provides an idea of the evolution of the frequency content over time. Other time-frequency representations can also be used such as the Wigner representation or the like.

In the vehicles VE having a wheel RO, the wheels RO can emit vibrations which are manifested in the time-frequency plane by a series of peaks (frequency trajectory $\xi_t$). The sources related to the wheels are manifested by continuous and smooth trajectories (frequency trajectory $\xi_t$) without sudden jumps in the speed v. The fundamental frequency (frequency trajectory $\xi_t$) and its harmonics (other frequency components COMPF) are the most energetic in the time-frequency plane. The frequency of the speed v of the wheel RO of the vehicle VE is manifested in the successive spectra by a smooth trajectory varying according to the state of the system (acceleration, deceleration, stop, etc.). Thus, a simple way of estimating the instantaneous frequency of the signal X then amounts to seeking the positions of the most energetic peaks in the frequency band of the component to be followed (frequency trajectory $\xi_t$). Taking into account the multiple harmonics of the fundamental of the wheels and the addition of continuity constraints and the information on the direction make it possible to attenuate the continuous trajectories related to interference components such as the combustion of the engine of the vehicle.

During a fourth step E4 subsequent to the second step E2, the spectra SP t are filtered by one (or more) noise attenuation and/or deterministic feature extraction filter(s) FIL, to obtain a filtered spectrogram $S(f_t, t)$ of the signal X over the successive instants t. In the spectrogram $S(f_t, t)$, the frequency for the instant t is denoted by $f_t$. This pre-processing E4 makes it possible to provide a cleaner time-frequency representation. In this step E4, it is possible to differentiate the two cases where the target component (speed v) is quasi-stationary or highly non-stationary. In the case of a quasi-stationary target component (speed v), the filter FIL can comprise a separation filter (DRS: deterministic random separation) of deterministic (and therefore predictable) features with respect to random (and therefore not predictable) features, comprising background noise and non-stationary interfering components. In the case of a highly non-stationary target component (speed v), the filter FIL can be configured to reduce the background noise and the time-invariant frequencies (for example ventilation noise, electrical components) and can comprise for this purpose a sliding median filter. An example of a spectrogram $S(f_t, t)$ filtered from the signal of FIG. 5 is illustrated in FIG. 7. The maximum frequency variation (to ensure the continuity of the signal) of the filtered spectrum $S(f_t, t)$ can be determined by the calculator CAL or have been pre-recorded in the calculator CAL or be prescribed by the user on the physical data input interface INT1.

During a fifth step E5 subsequent to the fourth step E4, a frequency trajectory $\xi_t$, representative of the instantaneous speed v of the wheel RO of the vehicle VE in the filtered spectrogram $S(f_t, t)$ over the successive instants t, is estimated by the calculator CAL. This step E5 comprises the sub-steps E51, E52, E53 which will be described below. In what follows, the frequency trajectory $\xi_t$ is also denoted $\xi$.

Indeed, the travel speed v of the wheel RO of the vehicle VE results in a certain frequency component in the time-frequency plane of the spectrogram $S(f_t, t)$, this frequency component possibly having a certain frequency (equal in what follows to the frequency trajectory $\xi_t$) varying over time and a certain amplitude varying over time. This frequency $\xi_t$ varying over time t in the spectrogram $S(f_t, t)$ therefore forms a frequency trajectory $\xi_t$ of the speed v of the wheel RO of the vehicle VE as a function of time t in the spectrogram $S(f_t, t)$ (and therefore in the time-frequency plane of FIG. 3). This frequency trajectory $\xi_t$ is mixed with trajectories of other frequencies of other frequency components COMPF in the spectrogram $S(f_t, t)$, as illustrated in FIG. 3. According to one embodiment, for the wheel RO rolling on the ground, the instantaneous frequency of rotation of the wheel RO (number of revolutions per seconds) at the successive instants t is the frequency trajectory $\xi_t$ as a function of time t. According to another embodiment, for the wheel RO rolling on the ground, the tangential speed of the wheel RO (number of revolutions per seconds multiplied by the radius of the wheel RO and multiplied by $2\pi$) at the successive instants t is the frequency trajectory $\xi_t$ as a function of the time t.

Let $N_S$ the number (greater than or equal to 2) of time segments or successive instants t in the spectrogram $S(f_t, t)$ (abscissa axis in FIG. 2), that is to say the instants $t \in \{1, \ldots, N_S\}$. Let $L_S$ the number (greater than or equal to 2) of frequency trays in the filtered spectrogram $S(f_t, t)$. The frequencies of each spectrogram $S(f_t, t)$ at the instant t are denoted $f_t$. The true unknown frequency trajectory $\xi_t$ to be estimated is also denoted $\bar{F}=(\bar{f}_1, \ldots, \bar{f}_{N_S})$ The number $N_S$ of successive instants t can be determined by the calculator CAL or have been pre-recorded in the calculator CAL or be prescribed by the user on the physical data input interface INT1.

According to one embodiment of the invention, a support $\Omega$ of frequency values $\{f^1, \ldots, f^{L_S}\}$, namely $\Omega=\{f^1, \ldots, f^{L_S}\}$ is determined during the second step E2 by the calculator CAL. The support $\Omega$ of values $\{f^1, \ldots, f^{L_S}\}$ is the support of the frequencies of the spectrogram $S(f_t, t)$ and can comprise all the frequency values comprised between zero and a maximum frequency, for example evenly distributed frequencies, which may be multiples of a prescribed frequency step to the nearest prescribed constant. The number $L_s$ of frequency values of the support $\Omega$ is finite and can be determined by the calculator CAL or have been pre-recorded in the calculator CAL or be prescribed by the user on the physical data input interface INT1. The frequency step can be calculated by the calculator CAL as a function of the sampling frequency and/or as a function of the duration of the window $W_t$.

The frequency trajectory $\xi_t$ to be estimated is also denoted $\overline{F}=(\overline{f}_1, \ldots, \overline{f}_{N_S})$. We therefore have for the successive instants t ranging from 1 to $N_s$, the frequency trajectory $\xi_t$ equal to a set of frequencies that is to say $\xi_t=(\xi_1, \ldots, \xi_{N_S})$ which is a random variable modeling the trajectory $\xi_t$ to be estimated. The frequency trajectory $\xi_t$ can take the frequency values $\xi_1, \ldots, \xi_{N_S}$ in the support $\Omega=\{f^1, \ldots, f^{L_S}\}$ of frequency values of the spectrogram $S(f_t, t)$.

The chain of the successive frequencies $\xi_1, \ldots, \xi_{N_S}$ of the frequency trajectory $\xi_t$ over time t can be described by a probability of transition $p_{\xi_{t+1}|\xi_t}$ and a given initial probability $p_{\xi_1}$.

According to one embodiment, during the third step E3 subsequent to the second step E2 and prior to the fourth step E4, a probability of transition $p_\xi$ of the frequency trajectory $\xi_t$ is prescribed by the calculator CAL according to a Markov chain linking the probability of transition from the frequency $\xi_t$ of this trajectory at the present instant t to the frequency $\xi_{t+1}$ of this trajectory at the following instant t+1, starting from the given initial probability $p_{\xi_1}$. This probability of transition $p_\xi$ follows an a priori law. In what follows, the probability of transition $p_\xi$ of the frequency trajectory $\xi_t$ is denoted $p_\xi(f_1, \ldots, f_{N_S})$. An example of probability of transition $p_\xi$ calculated from the signal of FIG. 5 is illustrated in FIG. 9. The probability of transition describing the possible evolutions of the speed over time was specified in advance. Concretely, a large frequency variation has a low probability and a small variation has a high probability. This probability of transition defines what is called a Markov chain.

According to one embodiment of the invention, the calculator CAL calculates during step E3 the probability $p_\xi(f_1, \ldots, f_{N_S})$ of transition of the frequency trajectory for the instant $N_S$ starting from the given initial probability $p_{\xi_1}$ of the instant 1, for $t\in\{1, \ldots, N_S\}$ and for each frequency $f_t\in\Omega$ (that is to say each $f_1, \ldots, f_{N_S}\in\Omega$) according to the following equation:

$$p_\xi(f_1, \ldots, f_{N_S}) = p_{\xi_1}(f_1)\prod_{t=1}^{N_S-1} p_{\xi_{t+1}|\xi_t=f_t}(f_{t+1})$$

$p_{\xi_1}(f_1)$ is the given initial probability of the instant t=1. In this equation, $p_{\xi_{t+1}|\xi_t=f_t}(f_{t+1})$ is the probability of transition from the frequency $\xi_t$ of the trajectory of the present instant t to the frequency $\xi_{t+1}$ of the trajectory of the next instant t+1.

We therefore have the joint law of the frequency trajectory $\xi$, which is given by:

$$\forall (f_1, \ldots, f_{N_S}) \in \Omega^{N_S},\ p_\xi(f_1, \ldots, f_{N_S}) = p_{\xi_1}(f_1)\prod_{t=1}^{N_S-1} p_{\xi_{t+1}|\xi_t=f_t}(f_{t+1})$$

(a priori law (2))

According to one embodiment of the invention, the calculator CAL calculates during step E3 the probability $p_{\xi_{t+1}|\xi_t=f_t}(f_{t+1})$ of transition from the frequency $\xi_t$ of the trajectory of the present instant t to the frequency $\xi_{t+1}$ of the trajectory of the next instant t+1 according to a conditional Gaussian law N centered on the frequency $f_t$ of the filtered spectrogram $(S(f_t, f)$ at the instant t, that is to say:

$$p_{\xi_{t+1}|\xi_t=f_t}(f) \equiv N(f_t, \sigma_t^2),$$

where $$\sigma_t^2$$

is the variance of the conditional Gaussian distribution N and the frequency $f_t$ is the mean of the conditional Gaussian distribution N. This makes it possible to maintain a certain regularity of the harmonic to be followed and to add continuity constraints between the consecutive instants t and t+1.

According to one embodiment of the invention, the calculator CAL calculates during step E3 the standard deviation $\sigma_t$ of the conditional Gaussian law N as being $\sigma_t=\Delta t\cdot\gamma_t$, where $\Delta t$ is a calculated time resolution of the filtered spectrogram $(S(f_t, t)$, $\gamma_t$ is a calculated average speed with which the frequency trajectory $\xi_t$ evolves between instant t and the next instant t+1. Thus, by decreasing the variance $$\sigma_t^2,$$

the smoothing effect will be stronger. The calculation of the transition law $p_{\xi_{t+1}|\xi_t=f_t}(f_{t+1})$ by the calculator CAL can also take into account the direction of evolution (for example ascent, descent, stability) of the frequency trajectory $\xi_t$ when this direction is provided at each instant t. For example, the calculator CAL can use a transition distribution $p_{\xi_{t+1}|\xi_t=f_t}(f_{t+1})$ which is truncated on $\xi_{t+1}\geq\xi_t$ in the case of ascent of the frequency trajectory $\xi_t$ and which is truncated on $\xi_{t+1}\leq\xi_t$ in the case of descent of the frequency trajectory $\xi_t$. In the case where the frequency trajectory $\xi_t$ becomes constant (stopping of descent and ascent), for example at a zero value (stopping of the vehicle VE corresponding to a zero speed v), it is necessary to set $\gamma_t$ to a quite low value.

At the first sub-step E51 of the fifth step E5, a probability $p_{Z_t|\xi_t}$ of observation of the frequency trajectory $\xi_t$ of the travel speed v of the vehicle VE is estimated by the calculator CAL from a calculated amplitude of the spectrogram $S(f_t, t)$ filtered for each instant t. In what follows, the probability $p_{Z_t|\xi_t}$ of observation of the frequency trajectory $\xi_t$ of the travel speed v of the vehicle VE is denoted $p_{Z|\xi=(f_1, \ldots, f_{NS})}(Z_1, \ldots, Z_{N_S})$. An example of probability $p_{Z_t|\xi_t}$ of observation calculated from the signal of FIG. 5 is illustrated in FIG. 8.

According to one embodiment of the invention, the calculator CAL calculates during the sub-step E51 the probability $p_{Z_t|\xi_t}$ of observation knowing a trajectory as dependent on the calculated amplitude of the spectrogram $S(f_t, t)$ filtered and normalized for each instant t.

According to one embodiment of the invention, the calculator CAL calculates during the sub-step E51 the probability $p_{Z_t|\xi_t}$ of observation of the frequency trajectory $\xi_t$ for $t\in\{1, \ldots, N_S\}$ and for each frequency $f_t\in\Omega$ (that is to say each $f_1, \ldots, f_{N_S}\in\Omega$) according to the following equation:

$$p_{Z|\xi=(f_1, \ldots, f_{N_S})}(z_1, \ldots, z_{N_S}) = \prod_{t=1}^{N_S} p_{Z_t|\xi_t=f_t}(z_t)$$

The calculator CAL calculates during the sub-step E51 the binary vector Z or $Z_t$ of observation having a size $N_S$ prescribed for the instant $t\in\{1, \ldots, N_S\}$ (and for each frequency $f_t\in\Omega$, that is to say each $f_1, \ldots, f_{N_S}\in\Omega$) and being such that each of the coordinates $Z_t[f]$ of the binary vector $Z_t$ of observation (the coordinates $Z_t[f]$ of the binary vector $Z_t$ of observation therefore being $(z_1, \ldots, z_{N_S})$) is equal to:

$$Z_t[f]=1 \text{ if } \bar{f}_t=f=f_t$$

otherwise $Z_t[f]=0$ for $f\neq\bar{f}_t$ or $f\neq f_t$.

In the foregoing, $Z=(Z_1, \ldots, Z_{N_S})$ is the observation. The density or probability $p_{Z_t|\xi_t}$ of observations is then written as follows:

$$\forall (f_1, \ldots, f_{N_s}) \in \Omega^{N_s}, \forall (z_1, \ldots, z_{N_s}),$$

$$p_{Z|\xi=(f_1,\ldots,f_{N_s})}(z_1, \ldots, z_{N_s})\prod_{t=1}^{N_s} p_{Z_t|\xi_t=f_t}(z_t)$$

The probability of observation $p_{Z_t|\xi_t}$ is defined from the amplitude $|S(f_t, t)|$ of the spectrogram $S(f_t, t)$ for $f_t\in\Omega$. Indeed, it is possible to have an idea about the target trajectory $\xi_t$ and then confirm whether $\xi_t=f_t$ is very probable to be observed or not according to the level of the amplitude of the spectrogram at the point $(f_t, t)$ compared to the other points $(f, t)$, $f\in\Omega$.

The main idea of the method used is to calculate a probability density from the spectrogram describing the distribution of the observations knowing the target frequency $\xi_t$ at each instant t. Indeed, for a given $\xi_t=f_t\in\Omega$, the coefficient of $Z_t$ for the frequency $f_t$ has a high probability of being equal to 1 at the instant t, that is to say it is very probable that the true frequency $\bar{f}_t$ is equal to $f_t$.

According to one embodiment of the invention, the calculator CAL calculates during the sub-step E51 the probability $p_{Z_t|\xi_t}$ of observation of the frequency trajectory according to the following equations:

$$p_{Z_t|\xi_t=f_t}(z_t) = \prod_{f\in\Omega} p_{Z_t[f]|\xi_t=f_t}(z_t[f])$$

for $\xi_t=f_t\in\Omega$ with $p_{Z_t[f_t]|\xi_t=f_t}(z_t[f_t]=1)$ dependent on the calculated amplitude of the spectrogram $(S(f_t, t))$ filtered for each instant (t), $$p_{Z_t[f]|\xi_t=f_t}(z_t[f]=1)=0 \text{ for } f\neq f_t.$$

According to one embodiment of the invention, the calculator CAL calculates during the sub-step E51 the probability $p_{Z_t|\xi_t}$ of observation according to the following equation:

$$p_{Z_t|\xi_t=f_t}(z_t)=|S(f_t,t)|\cdot 1_{[f_{min}(t),f_{max}(t)]}(f_t)$$

where $|S(f_t, t)|$ is the calculated amplitude of the spectrogram $S(f_t, t)$ filtered for each instant t, $f_{min}(t)$ is a minimum frequency trajectory that has been measured, $f_{max}(t)$ is a maximum frequency trajectory that has been measured, $f_{min}(t)$ and $f_{max}(t)$ are such that $f_{min}(t)\leq\xi_t\leq f_{max}(t)$, $1_{[f_{min}(t),f_{max}(t)]}(f_t)$ is a function taking the value 1 for $f_t$ between $f_{min}(t)$ and $f_{max}(t)$ and taking the value 0 for $f_t$ below $f_{min}(t)$ or above $f_{max}(t)$ According to one embodiment of the invention, the calculator CAL calculates during the sub-step E51

$$p_{Z_t[f_t]|\xi_t=f_t}(z_t[f_t]=1) = \frac{1}{c_t}|S(f_t, t)|\cdot 1_{[f_{min}(t),f_{max}(t)]}(f_t)$$

where $|S(f_t, t)|$ is the calculated amplitude of the spectrogram $S(f_t, t)$ filtered for each instant t.

The calculator CAL calculates during the sub-step E51 the divisor coefficient c t as being the maximum of $z_t[f]$ for the frequency f located between the minimum frequency trajectory $f_{min}(t)$ and the maximum frequency trajectory $f_{max}(t)$, that is to say:

$$c_t = \max_{f\in[f_{min}(t),f_{max}(t)]} z_t[f]$$

The calculator CAL measures or determines during the sub-step E51 the minimum frequency trajectory $f_{min}(t)$. The calculator CAL measures or determines during the sub-step E51 the maximum frequency trajectory $f_{max}(t)$. The frequency trajectory $\xi_t$ of the travel speed v of the vehicle VE is comprised between the minimum frequency trajectory $f_{min}(t)$ and the maximum frequency trajectory $f_{max}(t)$. We therefore have $f_{min}(t)\leq\xi_t\leq f_{max}(t)$.

The calculator CAL calculates during the sub-step E51 the function $1_{[f_{min}(t),f_{max}(t)]}(f_t)$ as being a single slot function between $f_{min}(t)$ and $f_{max}(t)$), that is to say the function taking the value 1 for $f_t$ between $f_{min}(t)$ and $f_{max}(t)$ and taking the value 0 for $f_t$ below $f_{min}(t)$ or above $f_{max}(t)$.

The minimum frequency trajectory $f_{min}(t)$ and the maximum frequency trajectory $f_{max}(t)$ make it possible to take into account only the peaks of the components in the vicinity of the frequency trajectory $\xi_t$ to be followed and define a frequency band in which the frequency trajectory $\xi_t$ is located.

According to one embodiment of the invention, the minimum frequency trajectory $f_{min}(t)$ is fixed over time t, that is to say $f_{min}(t)=f_{min}$.

According to one embodiment of the invention, the maximum frequency trajectory $f_{max}(t)$ is fixed over time t, that is to say $f_{max}(t)=f_{max}$.

According to another embodiment of the invention, the minimum frequency trajectory $f_{min}(t)$ is variable over time t.

According to another embodiment of the invention, the maximum frequency trajectory $f_{max}(t)$ is variable over time t.

In the case where the target frequency trajectory $\xi_t$ is spread over a wide frequency band (for example ramp) where other interference harmonics can coexist, it is preferable to choose a variable frequency band over time t. This amounts to defining two trajectories $f_{min}(t)$ and $f_{max}(t)$ surrounding the frequency trajectory $\xi_t$. For example, the chosen frequency band contains only one complete continuous trajectory $\xi_t$ over the entire period of the considered time t. The continuity constraints which are introduced by the transition law $p_\xi$ have the effect of giving more weight to the peaks linked to a smooth curve of the frequency trajectory $\xi_t$. According to one embodiment of the invention, the trajectories $f_{min}(t)$ and $f_{max}(t)$ can be calculated automatically by the calculator CAL. According to one embodiment of the invention, the trajectories $f_{min}(t)$ and $f_{max}(t)$ can be prescribed by a user to the calculator CAL by random selection of the points of the spectrogram $S(f_t, t)$ surrounding the sequence of the peaks to be followed (amplitude maxima) of the spectrogram $S(f_t, t)$, then by interpolation of these points. The definition of the frequency band is optional but makes it possible to considerably improve the performance of the method and to minimize the calculation cost, especially in the case where the observed signal contains a large number of harmonics. It is also possible to identify the stop intervals and include this information in the definition of $f_{min}$ and $f_{max}$ and also in the transition law thereafter. If this information is not available, a simple way to estimate the stop instants from the spectrogram $S(f_t, t)$ is to compare the sum of the amplitudes of the spectrogram $S(f_t, t)$ at each instant $t_0$ on all the frequencies f to a given threshold (if $\Sigma_f A(f, t_0)<\varepsilon$, then stop at instant $t_0$, where $\varepsilon>0$ is a threshold to be set (for example the median of all the values on the entire time axis)). The minimum frequency trajectory $f_{min}(t)$ and/or the maximum frequency trajectory $f_{max}(t)$ can be entered by the user on the physical data input interface INT1 or have been pre-recorded in the calculator CAL. In the case where the device 1 is integrated into a navigation device of the vehicle VE, a priori possible data such as for example $f_{min}=0$ and $f_{max}$ can be entered by the user on the physical data input interface INT1 or have been pre-recorded in the calculator CAL, for real-time navigation.

The probability of the observation $Z_t$ at each instant t is calculated by the calculator CAL knowing the target frequency $\xi_t=f_t\in\Omega$.

According to one embodiment of the invention, in the case of a single-component signal with an IF, if the spectrogram $S(f_t, t)$ of the noise-free signal is available, then $p_{Z_t|\xi_t\neq\bar{f}_t}(z_t)=0\forall f_t\neq\bar{f}_t$, that is to say the spectrum $Z_t$ can only be observed for the frequency $\bar{f}$. Otherwise, the $p_{Z_t|\xi_t=f_t}$ is important for all frequencies $f_t$ where the amplitude of the spectrogram $S(f_t, t)$ is maximum at the instant t. Thus, the function $f_t\rightarrow p_{Z_t|\xi_t=f_t}(z_t)$ can be multimodal in the case where several peaks (most often related to noise) are present at the instant t in $[f_{min}(t), f_{max}(t)]$. That is to say, this same observed spectrum can correspond to several solutions of plausible frequencies $f_t$. By considering the amplitude of the spectrogram $S(f_t, t)$ for several multiples of the target harmonic, it will be possible to favor one mode over another. According to one embodiment of the invention, the calculator CAL calculates during the sub-step E51 the probability $p_{Z_t|\xi_t}$ of observation according to the following equation: (the probability is written in this case as the product of several probabilities):

$$p_{Z_t|\xi_t=f_t}(z_t)=\prod_{j|j\cdot f_t<\frac{F_s}{2}}\frac{1}{c_t}|S(j\cdot f_t,t)|1_{[f_{min}(t),f_{max}(t)]}(f_t)$$

where j can be any positive integer or real number, satisfying $$j\cdot f_t<\frac{F_s}{2},$$

and where $F_S$ is a threshold frequency, that has been predetermined as a function of the spectrogram $S(f_t, t)$.

In the second sub-step E52 of the fifth step E5, an a posteriori law $p_{\xi|Z}$ of observation of the frequency trajectory $\xi_t$ or of the frequency $\xi_t$ is estimated by the calculator CAL. This a posteriori law $p_{\xi|Z}$ of observation is proportional to the product of the probability of transition $p_\xi$ of the frequency trajectory $\xi_t$ and of the probability $p_{Z_t|\xi_t}$ of observation of the frequency trajectory $\xi_t$, that is to say $p_{\xi|Z}\propto p_\xi\cdot p_{Z_t|\xi_t}$. This a posteriori law $p_{\xi|Z}$ of observation of the frequency trajectory $\xi_t$ is also denoted $p_{\xi_1,\ldots,\xi_{NS}|Z_1,\ldots,Z_{NS}}$ or $p_{\xi|Z}(f_1, \ldots, f_{N_S})$.

According to one embodiment of the invention, in the second sub-step E52 of the fifth step E5, the calculator CAL calculates the a posteriori law $p_{\xi|Z}$ of observation $$p_{\xi|Z}(f_1,\ldots,f_{N_s})\propto p_\xi(f_1,\ldots,f_{N_s})p_{Z|\xi=(f_1,\ldots,f_{N_S})}(z_1,\ldots,z_{N_s})$$

According to one embodiment of the invention, in the second sub-step E52 of the fifth step E5, the calculator CAL calculates the a posteriori law $p_{\xi|Z}$ of observation $$p_{\xi|Z}(f_1,\ldots,f_{N_s})\propto\prod_{t=1}^{N_s-1}p_{\xi_{t+1}|\xi_t=f_t(f_{t+1})}\prod_{t=1}^{N_s}p_{Z_t|\xi_t=f_t}(z_t)$$

According to one embodiment of the invention, in the second sub-step E52 of the fifth step E5, the calculator CAL calculates the a posterior law $p_{\xi|Z}$ of observation equal to the product of the probability of transition $p_\xi$ of the frequency trajectory $\xi_t$, of the probability $p_{Z_t|\xi_t}$ of observation of the frequency trajectory $\xi_t$ and of a multiplicative factor C calculated by the calculator CAL, that is to say $p_{\xi|Z}=C\cdot p_\xi\cdot p_{Z_t|\xi_t}$.

According to one embodiment of the invention, the multiplicative factor C can be taken equal to 1.

According to one embodiment of the invention, in the second sub-step E52 of the fifth step E5, the calculator CAL calculates the multiplicative factor C equal to:

$$C^{-1}=\sum_{f_1\in\Omega}\sum_{f_2\in\Omega}\cdots\sum_{f_{N_s}\in\Omega}p_\xi(f_1,\ldots,f_{N_s})p_{Z|\xi=(f_1,\ldots,f_{N_s})}(z_1,\ldots,z_{N_s})$$

According to one embodiment of the invention, in the second sub-step E52 of the fifth step E5, the calculator CAL calculates the a posteriori law $p_{\xi|Z}$ of observation equal to:

$$p_{\xi|Z}(f_1,\ldots,f_{N_s})=C.p_\xi(f_1,\ldots,f_{N_s})p_{Z|\xi=(f_1,\ldots,f_{N_S})}(z_1,\ldots,z_{N_s})$$

According to one embodiment of the invention, in the second sub-step E52 of the fifth step E5, the calculator CAL calculates the a posteriori law $p_{\xi|Z}$ of observation $$p_{\xi|Z}(f_1,\ldots,f_{N_s})=C\cdot\prod_{t=1}^{N_s-1}p_{\xi_{t+1}|\xi_t=f_t}(f_{t+1})\prod_{t=1}^{N_s}p_{Z_t[f_t]|\xi_t=f_t}(z_t[f_t]=1)$$

In the third sub-step E53 of the fifth step E5, the calculator CAL estimates the frequency trajectory $\xi_t$ for the successive instants t from the a posteriori law $p_{\xi|Z}$ of observation of the frequency trajectory $\xi_t$. The calculator CAL calculates as frequency trajectory $\xi_t$ the optimal trajectory $\hat{\xi}=(\hat{f}_1, \hat{f}_2, \ldots, \widehat{f_{N_s}})$ among all the possible trajectories in the spectrogram(s) $S(f_t, t)$ from the a posteriori lawn $p_{\xi|Z}$ of observation of the frequency trajectory $\xi_t$, knowing the observations Z given by the probability $p_{Z_t|\xi_t}$ of observation. An example of frequency trajectory $\xi_t$ calculated from the signal of FIG. 5 is illustrated in FIG. 10. The frequency trajectory $\xi_t$ or $\hat{f}$ and/or one or more frequency value(s) of the frequency trajectory $\xi_t$ or $\hat{f}$ (which may be equal to the instantaneous frequency of the wheel RO) can be provided by the calculator CAL on the physical data output interface INT2, for example by being displayed on a screen. A calculation confidence interval that has been calculated by the calculator can be provided by the calculator CAL on the physical data output interface INT2, for example by being displayed on a screen. In the case where the device 1 is integrated into a navigation device of the vehicle VE, the frequency trajectory $\xi_t$ or $\hat{f}$ and/or one or more frequency value(s) of the frequency trajectory $\xi_t$ or $\hat{f}$ can be stored in the memory M or in another memory and be evaluated in real time in another filter for real-time navigation.

According to one embodiment of the invention, in the third sub-step E53 of the fifth step E5, the calculator CAL estimates for each instant t the frequency trajectory $\xi_t$ as being the one of the frequency values $f^1, \ldots, f^{L_S}$ in the support $\Omega$ that maximizes the a posteriori law $p_{\xi|Z}$ of observation of the frequency trajectory $\xi_t$ of the travel speed v of the vehicle VE at this instant t. In this case, the calculator CAL selects for each instant t the frequency trajectory $\xi_t$ in the support $\Omega$ of the frequency values $\{f^1, \ldots, f^{L_S}\}$. Therefore, in this case we have the frequency trajectory $\xi_t$, which is equal to $\hat{f}=\operatorname{argmax} p_{\xi|Z}$. The calculator comprises an estimator of the maximum a posteriori maximizing $p_{\xi|Z}(f_1, \ldots, f_{N_S})$. The resolution of this optimization problem can be easily carried out for example by using dynamic programming.

According to one embodiment of the invention, in the third sub-step E53 of the fifth step E5, the calculator CAL calculates the a posteriori law $p_{\xi|Z}$ of observation by (for example two-dimensional) convolution of the probability $p_{Z_t|\xi_t}$ of observation by Gaussian kernels of the probability of transition $p_\xi$.

According to one embodiment of the invention, in the third sub-step E53 of the fifth step E5, the calculator CAL recursively calculates the a posteriori law $p_{\xi_t|Z_1, \ldots Z_t}$ according to the following equation:

$$p_{\xi_t|Z_1, \ldots Z_t} \propto (p_{\xi_t|Z_1, \ldots Z_{t-1}} * N) p_{Z_t|\xi_t}$$

Where * is the convolution operator and N is a Gaussian kernel representing the density $p_{\xi_t|\xi_{t-1}}$. These operations are not costly.

It then estimates for each instant t the frequency trajectory $\xi_t$ or the frequency $\xi_t$ as being a barycenter of the a posteriori law $p_{\xi_t|Z_1, \ldots Z_t}$, which is taken respectively at the frequency values $f^1, \ldots, f^{L_S}$ of the support $\Omega$ and which is subjected respectively to these frequency values $f^1, \ldots, f^{L_S}$. The frequency $\xi_t$ thus obtained is in this case a linear combination of the frequency values $f^1, \ldots, f^{L_S}$ of the support $\Omega$, whose weights are formed by the a posteriori law $p_{\xi|Z}$, taken respectively at the frequency values $f^1, \ldots, f^{L_S}$ of the support $\Omega$. We therefore have in this case the frequency trajectory $\xi_t$ of the travel speed v of the vehicle VE, which is equal to:

$$\hat{f}_t = \sum_{f\in\Omega} f \cdot p_{\xi=f|Z_1, \ldots, Z_t}$$

The frequency trajectory $\xi_t$ is thus a kind of an a posteriori mean, which generates smoother results.

During a sixth step E6 subsequent to the fifth step E5, the calculator CAL estimates the travel speed v of the wheel RO of the vehicle VE for the successive instants t from the frequency trajectory $\xi_t$. The travel speed v of the wheel RO of the vehicle VE can be provided by the calculator CAL on the physical data output interface INT2, for example by being displayed on a screen. In the case of a navigation device, the travel speed v of the wheel RO of the vehicle VE can be stored in the memory MEM or in another memory and be evaluated in real time in another filter for real-time navigation.

According to one embodiment of the invention, in the sixth step E6, the calculator CAL estimates the travel speed v of the wheel RO of the vehicle VE for the instant t by multiplying the frequency trajectory $\xi_t$ of the travel speed v of the vehicle VE by the perimeter $2\pi R$ of the wheel RO, where R is the radius of the wheel RO and is predetermined or estimated, for example during the navigation by any method. The speed v is also denoted $\hat{v}$ and is in this case a tangential speed. We therefore have $\hat{v}=2\pi R\xi_t$ or $\hat{v}=2\pi R\hat{f}$. The radius R and/or the diameter of the wheel RO and/or the perimeter $2\pi R$ of the wheel RO may have been entered by the user on the physical data input interface INT1 or have been pre-recorded in the calculator CAL.

According to another embodiment of the invention, in the sixth step E6, the calculator CAL estimates the travel speed v of the wheel RO of the vehicle VE for the instant t as being the frequency of rotation of the wheel RO of the vehicle VE (number of revolutions per seconds), equal to the frequency trajectory $\xi_t$ at the instant t.

The invention has in particular the following advantages:

- Removal of a sensor, no more need for an odometer. This is very interesting, especially in aeronautics where the sensors are very expensive not only for their resistance to an extreme environment (high pressure and temperature) but also for a logistical reason where the slightest sensor changes the modal properties of the structure.
- Accurate estimation of the instantaneous speed v by using the information present in a multitude of linearly related harmonics, making it possible to estimate the fine variations of this speed instead of a rough estimate.
- The problem of interception of frequencies or rotation speeds (commonly present in aircraft engines) is also considered, as well as the continuity of this variation.
- The method offers the possibility of increasingly improving the accuracy of the estimate by allowing the user to give a priori on the speed (for example if we are in ascent regime or in quasi-stationary regime, according to FIG. 4). Although this information is not mandatory, it can significantly improve the quality of the signal obtained.

Of course, the embodiments, characteristics, possibilities and examples described above can be combined with each other or selected independently of each other.

The invention claimed is:

1. A method for estimating a travel speed of a vehicle having at least one wheel for rolling on a ground, comprising the following steps:

- measuring a signal being inertial or vibratory by at least one inertial or vibratory sensor of the vehicle,
- calculating by at least one calculator a plurality of spectra of the signal over a plurality of successive time windows defined with respect to instants being successive, the plurality of spectra forming at least one spectrogram as a function of the instants,
- filtering the at least one spectrogram by at least one noise attenuation and/or deterministic feature extraction filter, to obtain at least one filtered spectrogram of the signal on the instants,
- estimating by the at least one calculator a frequency trajectory representative of the travel speed of the at least one wheel of the vehicle in the at least one filtered spectrogram on the instants, by:

estimating by the at least one calculator a probability of observation of the frequency trajectory from a calculated amplitude of the at least one filtered spectrogram for each instant, estimating by the at least one calculator an a posteriori law of observation of the frequency trajectory as being proportional to a product of a prescribed probability of transition of the frequency trajectory and of the probability of observation of the frequency trajectory, estimating by the at least one calculator the frequency trajectory for the instants from the a posteriori law of observation of the frequency trajectory, estimating by the at least one calculator the travel speed of the at least one wheel of the vehicle for the instants from the frequency trajectory, that has been estimated, controlling real-time navigation of the vehicle by an inertial navigation device of the vehicle using the estimated travel speed.

2. The method according to claim 1, comprising determining by the at least one calculator a support of frequency values, estimating by the at least one calculator the frequency trajectory as being for each instant in the support the frequency value that maximizes the a posteriori law of observation of the frequency trajectory until this instant.

3. The method according to claim 1, comprising determining by the at least one calculator a support of frequency values, estimating by the at least one calculator a frequency for each instant as being a barycenter of the a posteriori law of observation of the frequency, taken at the frequency values of the support and subjected to these frequency values.

4. The method according to claim 1, comprising determining by the at least one calculator a support 2 of frequency values, estimating by the at least one calculator the probability of observation knowing the frequency trajectory as dependent on the calculated amplitude of the at least one filtered spectrogram being normalized for each instant.

5. The method according to claim 4, comprising estimating by the at least one calculator the probability $p_{Z_t|\xi_t}$ of observation is according to the following equation:

$$p_{Z_t|\xi_t=f_t}(z_t)=|S(f_t,t)|\cdot 1_{[f_{min}(t)/f_{max}(t)]}(f_t)$$

where $|S(f_t, t)|$ is the calculated amplitude of the at least one spectrogram $S(f_t, t)$ filtered for each instant t, $f_{min}(t)$ is a minimum frequency trajectory that has been measured, $f_{max}(t)$ is a maximum frequency trajectory that has been measured, $f_{min}(t)$ and $f_{max}(t)$ are such that $f_{min}(t)\leq\xi_t\leq f_{max}(t)$, $1_{[f_{min}(t),f_{max}(t)]}(f_t)$ is a function taking the value 1 for $f_t$ between $f_{min}(t)$ and $f_{max}(t)$ and taking the value 0 for $f_t$ below $f_{min}(t)$ or above $f_{max}(t)$.

6. The method according to claim 4, comprising estimating by the at least one calculator the probability $p_{Z_t|\xi_t}$ of observation according to the following equation:

$$p_{Z_t|\xi_t=f_t}(z_t)=\prod_{j|j\cdot f_t<\frac{F_s}{2}}\frac{1}{c_t}|S(j\cdot f_t,t)|1_{[f_{min}(t),f_{max}(t)]}(f_t)$$

where j is a positive integer or real number, satisfying $$j\cdot f_t<\frac{F_s}{2}$$

where $f_t$ denotes the frequencies of each at least one filtered spectrogram $S(f_t, t)$ at the instant t, and where $F_S$ is a threshold frequency that has been predetermined as a function of the at least one filtered spectrogram $S(f_t, t)$.

7. The method according to claim 1, comprising determining by the at least one calculator a support Ω of frequency values, prescribing by the at least one calculator the prescribed probability $p_\xi(f_1, \ldots, f_{N_s})$ of transition of the frequency trajectory $\xi_t$ for the instant $N_S$ starting from a given initial probability $p_{\xi_1}$ of the instant 1, for $t\in\{1, \ldots, N_S\}$ and for each frequency value $f_t\in\Omega$ according to the following equation:

$$p_\xi(f_1,\ldots,f_{N_s})=p_{\xi_1}(f_1)\prod_{t=1}^{N_s-1}p_{\xi_{t+1}|\xi_t=f_t}(f_{t+1})$$

where $N_S$ is a prescribed integer, greater than or equal to two, of the instants t being prescribed, where $p_{\xi_{t+1}|\xi_t=f_t}(f_{t+1})$ is the prescribed probability of transition from a frequency $\xi_t$ of the frequency trajectory of the instant t being present to a frequency $\xi_{t+1}$ of the frequency trajectory of the instant t+1 being next.

8. The method according to claim 7, wherein the prescribed probability $p_{\xi_{t+1}|\xi_t=f_t}(f_{t+1})$ of transition from the frequency $\xi_t$ of the frequency trajectory of the instant t to the frequency $\xi_{t+1}$ of the frequency trajectory of the instant t+1 follows a conditional Gaussian law centered on the frequency $f_t$ of the at least one filtered spectrogram at the instant t.

9. The method according to claim 8, wherein the conditional Gaussian law centered on the frequency $f_t$ has a standard deviation $\sigma_t=\Delta t\cdot\gamma_t$ where Δt is a calculated time resolution of the at least one spectrogram of the instant t, $\gamma_t$ is a calculated average speed with which the frequency trajectory $\xi_t$ evolves between the instant t and the instant t+1.

10. The method according to claim 8, wherein the noise attenuation and/or deterministic feature extraction filter comprises a sliding median filter and/or a deterministic feature separation filter with respect to random features.

11. The method according to any claim 1, comprising estimating by the at least one calculator the travel speed of the at least one wheel of the vehicle by multiplying the frequency trajectory by 2πR, where R is a radius of the at least one wheel and is predetermined or estimated.

12. A non-transitory computer readable medium containing computer instructions stored therein for causing a computer processor to perform the method for estimating the travel speed of the vehicle according to the claim 1.

13. A device for estimating a travel speed of a vehicle having at least one wheel for rolling on a ground, wherein the device comprises:

an inertial or vibratory sensor of the vehicle configured to measure a signal being inertial or vibratory, a calculator configured to calculate a plurality of spectra of the signal over a plurality of successive time windows defined with respect to instants being successive, the plurality of spectra forming at least one spectrogram as a function of the instants, a filter configured to attenuate noise and/or extracting deterministic features in the at least one spectrogram, to obtain at least one filtered spectrogram of the signal over the instants, the calculator configured to estimate a frequency trajectory, representative of the travel speed of the at least one wheel of the vehicle in the at least one filtered spectrogram over the instants, by:

estimation, by the calculator, of a probability of observation of the frequency trajectory from a calculated amplitude of the at least one filtered spectrogram for each instant, estimation, by the calculator, of an a posteriori law of observation of the frequency trajectory as being proportional to a product of a prescribed probability of transition of the frequency trajectory and of the probability of observation of the frequency trajectory, estimation, by the calculator, of the frequency trajectory for the instants from the a posteriori law of observation of the frequency trajectory, the calculator configured to estimate the travel speed of the at least one wheel of the vehicle for the instants from the frequency trajectory, the device configured to control real-time navigation of the vehicle using the estimated travel speed, the device being integrated into an inertial navigation device.

* * * * *